2,894,984
Patented July 14, 1959

2,894,984
4-TRIFLUOROMETHYL SALICYLIC ACIDS AND THEIR PREPARATION

Murray Hauptschein, Glenside, Pa., assignor to Pennsalt Chemicals Corporation, Philadelphia, Pa., a corporation of Pennsylvania No Drawing. Application May 15, 1958
Serial No. 735,646

9 Claims. (Cl. 260—519)

This invention relates to novel 4-trifluoromethylsalicylic acids and to their preparation by carboxylation of trifluoromethylphenols. Particularly, this invention relates to 4-trifluoromethylsalicylic acids represented by the formula

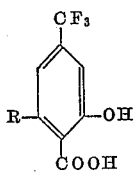

wherein R represents NH₂ or OH. More particularly this invention relates to 6-amino-4-trifluoromethylsalicylic acid and 4-trifluoromethyl-6-hydroxysalicylic acid and to the preparation of these and of 4-trifluoromethylsalicylic acid. The compounds of this invention are useful intermediates for the preparation of terephthalic acid derivatives used in formation of polyester resins and polymers.

This application is a continuation-in-part of copending application Serial No. 447,390, filed August 2, 1954, now abandoned.

It is known in the art to prepare an aromatic hydroxy acid by carbonating under pressure and at elevated temperature a mixture of free phenol and excess anhydrous potassium carbonate to obtain the potassium salt of the carboxyphenol which upon acidification gives the free acid in good yield. Marasse, S.: German Patents 73,279 (1893) and 78,708 (1894). The Marasse method is a modification of the well-known Kolbe-Schmitt method. Kolbe, H.: J. prakt. Chem [2] 10, 89 (1874). Schmitt, R.: German Patents 29,939 (1884), 38,742 (1886).

In the carbonation of the phenolic nucleus it is known that, in general, electron-donating substituents facilitate the carbonation reaction, while electron-withdrawing substituents retard or inhibit carbonation. Thus, the presence of amino, methoxy, or additional hydroxyl groups usually enables the reaction to be carried out at lower temperatures and with increased yields of products. In contrast, electron-withdrawing substituents such as nitro, nitrile and carboxylate ion retard carbonation. Thus, m-nitrophenol gives only a 19 percent yield of acid under Marasse conditions (Wessely, F., et al.: Monatsh. 81, 1071 (1950), while the o- and p-nitro- and o-cyanophenols are inert (Isemer, G.: Doctoral Thesis, Halle, 1951).

I have now found that when the electron-withdrawing substituent group trifluoromethyl is present on the phenolic nucleus, in meta position to the hydroxyl group, either alone or in the added presence of an amino group or of an hydroxyl group in the other meta position to the first hydroxyl group, that in treatment of any one of these trifluoromethyl-substituted phenols by the Kolbe-Schmitt or Marasse methods, preferably the latter, there is obtained a surprisingly high yield of the corresponding trifluoromethylsalicylic acid. Thus, in contrast to the 19% yield obtained when the electron-withdrawing substituent is nitro, a yield of 88% was obtained when the trifluoromethyl group was present as the electron-withdrawing substituent, e.g. in m-trifluoromethylphenol.

In practicing my invention a m-trifluoromethylphenol represented by the formula

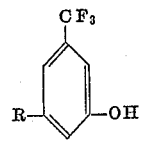

wherein R represents H, NH₂ and OH is reacted with excess potassium carbonate and carbon dioxide under a pressure of from about 5 to about 50 atmospheres at a temperature in the range from about 20° C. to about 250° C. for a period of time at least sufficient to form the potassium salt of the m-trifluoromethylphenol, cooling the reaction mass, and acidifying it with a mineral acid to form the corresponding 4-trifluoromethylsalicylic acid represented by the formula

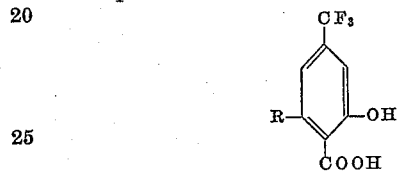

where R is the same as above.

For example, as shown in Table I, 3-trifluoromethylphenol (I) is carboxylated to 4-trifluoromethylsalicylic acid (II) disclosed and claimed in copending application Serial No. 735,647, filed May 15, 1958, 3-amino-5-trifluoromethylphenol (III) is carboxylated to 6-amino-4-trifluoromethylsalicylic acid (IV); and 5-trifluoromethylresorcinol (V) is carboxylated to 4-trifluoromethyl-6-hydroxysalicylic acid (VI).

TABLE I

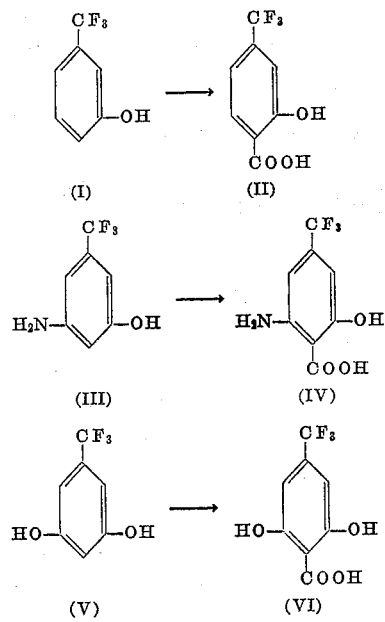

In carrying out the carboxylation procedure, the trifluoromethylphenol compound and potassium carbonate are placed in an autoclave which is then closed and the carbon dioxide required is then introduced through a suitably valved inlet.

The total amount of carbon dioxide used in carrying out the reaction preferably should be in at least sufficient excess of the stoichiometric amount required, so that a positive pressure is maintained in the cooled autoclave at the end of the reactions. The upper limit of the amount of carbon dioxide introduced into the autoclave at any one time will be determined by the design and safe operating pressure limit of the autoclave.

The temperature of the charged autoclave is gradually raised from room temperature as the carbon dioxide is consumed. A fairly slow rise in temperature is beneficial, and immediate increasing of the temperature to above 140° C. is not recommended. A temperature in the range of about 100° C. to 180° C. is preferred during the major portion of the reaction. A maximum temperature below about 250° C. is desirable.

At least a stoichiometric amount of potassium carbonate is required, but a molar ratio of about 3:1 to 10:1 of the carbonate to the trifluoromethylphenol compound is preferably used.

The following examples illustrate in more detail the processes of this invention, but in no way are to be construed as limiting in scope.

Example 1
PREPARATION OF 4-TRIFLUOROMETHYLSALICYLIC ACID m-trifluoromethylphenol (48.6 g.) and granular anhydrous potassium carbonate (124.4 g.) were intimately dispersed in a copper bomb of 250 ml. capacity, and carbon dioxide gas from a commercial cylinder was introduced at 300 p.s.i. at room temperature. The temperature was allowed to rise very slowly over a period of ten days to 220° C. It was noted that some carbon dioxide was absorbed even at room temperature and that at 140° C. the reaction was nearly completed. As the carbon dioxide was taken up, additional gas was introduced. At the completion of the reaction the bomb was cooled, vented, and opened. The product was a hard cake of 4-trifluoromethylsalicylate. The cake was dissolved in hot water. The solution was extracted with ether, neutralized to a pH of about 6, decolorized with charcoal, and filtered. The filtrate was acidified with concentrated hydrochloric acid. An 88% yield of 4-trifluoromethylsalicylic acid was obtained. No isomers were found present, and only a trace of unreacted phenol was detected in the product. On recrystallization from alcohol and water, the 4-trifluoromethylsalicylic acid was found to melt at 178–178.5° C. (white needles).

Analysis.—Calcd. for $C_8H_5O_3F_3$: C, 46.61; H, 2.45; mol. wt. 206. Found: C, 46.55; H, 2.46; mol. wt. (neut. eq.), 208.

4-trifluoromethylsalicylic acid is miscible with ethanol but only very slightly soluble in water.

Example 2
PREPARATION OF 6-AMINO-4-TRIFLUOROMETHYL-SALICYLIC ACID 3-amino-5-trifluoromethylphenol (8.85 g.) and granular anhydrous potassium carbonate (21 g.) were intimately mixed and added to a stainless steel pressure vessel, 500 p.s.i. of carbon dioxide being introduced from a commercial cylinder at room temperature. The temperature was allowed to rise progressively over a period of three days from room temperature to 191° C. Upon allowing the vessel to cool to room temperature, the pressure read 400 p.s.i. The bomb was vented, opened, and the loose brown cake dissolved in a minimum of hot water. The solution was filtered to remove some black material and then slightly acidified to pH of approximately 6, whereupon it was decolorized with Norite, an activated charcoal. On cooling and extracting with ether, 3.5 g. of 6-amino-4-trifluoromethylsalicylic acid was obtained. The compound melted at 162° C., with decomposition and was pale yellow in color. Recrystallization of the product from hot water raised the product's melting point to 165° C., with decomposition. Deamination with hypophosphorous acid gave a good yield of 4-trifluoromethylsalicylic acid. This proved the product of the carbon dioxide reaction to be 6-amino-4-trifluoromethylsalicylic acid.

Analysis.—Calcd. for $C_8H_6O_3NF_3$: C, 43.45; H, 2.74; N, 6.34. Found: C, 43.94; H, 2.66; N, 6.23.

Example 3
PREPARATION OF 4-TRIFLUOROMETHYL-6-HYDROXY-SALICYLIC ACID 5-trifluoromethylresorcinol (0.5 g.) and 2.66 g. of anhydrous granular potassium carbonate were intimately mixed and placed in a stainless steel pressure vessel to which was introduced carbon dioxide from a cylinder. The reactor was heated over a period of 2 weeks from room temperature to 120° C. and then cooled, vented and opened. The solid light brown cake was dissolved with heating in a minimum of water, slightly acidified and then decolorized. The filtrate upon cooling and further acidification yielded 4-trifluoromethyl-6-hydroxysalicylic acid, a white powder, M.P. 183–186° C. with decomposition.

Analysis.—Calcd. for $C_8H_5O_4F_3$: C, 43.26; H, 2.27. Found: C, 43.25; H, 2.56.

The novel compounds of my invention are particularly useful as chemical intermediates for the preparation of certain terephthalic acid derivatives which find use in the manufacture of synthetic high polymer fibers, J. Chem. Soc. Japan, Ind. Chem. Sect. 57, 212 (1954). My novel compounds are readily converted to the terephthalic acid derivative form by hydrolysis of the trifluoromethyl radical to a carboxyl radical, by known methods e.g. by treatment with concentrated sulfuric acid. For example, as shown in Table II, 4-trifluoromethylsalicylic acid (I) is hydrolyzed to 2-hydroxyterephthalic acid (II); 6-amino-4-trifluoromethylsalicylic acid (III) is hydrolyzed to 6-amino-2-hydroxyterephthalic acid (II); and 4-trifluoromethyl-6-hydroxysalicylic acid (V) is hydrolyzed to 2,6-dihydroxyterephthalic acid (VI).

TABLE II

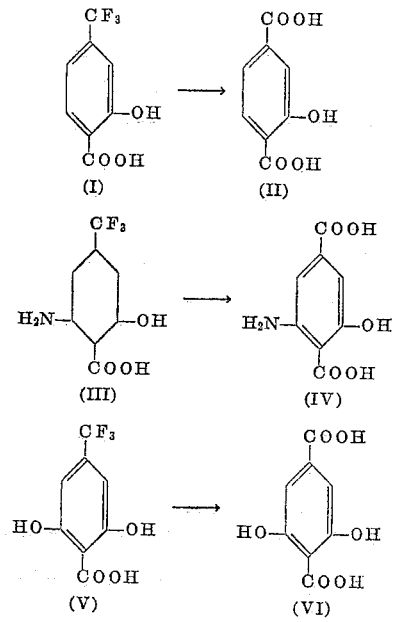

Example 4
PREPARATION OF 2-HYDROXYTEREPHTHALIC ACID

Crystalline 4-trifluoromethylsalicylic acid (0.80 g.) was heated in a Pyrex tube on a Bunsen flame with 6 ml. of concentrated sulfuric acid. The solution turned deep brown and hydrogen fluoride fumes were liberated. After pouring the reaction mass into ice-water and recrystallizing the resultant precipitate with alcohol and water, there was isolated 0.60 g. (85%) of the known 2-hydroxyterephthalic acid (M.P. 327° C.; dimethyl ester, M.P. 93–94° C.; recrystallized from alcohol), thus proving the structure of 4-trifluoromethylsalicylic acid.

The terephthalic derivatives prepared from my novel compounds are readily converted to polymeric materials by methods known in the art, as described, for example, in "Encyclopedia of Chemical Technology," Kirk-Othmer, vol. 10, p. 603 (Interscience) (1953).

The 5-amino isomer of 6-amino-4-trifluoromethylsalicylic acid, also disclosed and claimed in Serial No. 447,390, now abandoned, is prepared from the dye 4-trifluoromethyl-5-(3-nitro-1-phenylazo)-salicylic acid, disclosed and claimed in another continuation-in-part application Serial No. 735,644, filed May 15, 1958, based on the same parent case. The isomer, 5-amino-4-trifluoromethylsalicyclic acid, is prepared as shown in the following example.

*Example 5*

5.2 g. of the dye, 4-trifluoromethyl-5-(3-nitro-1-phenylazo)salicylic acid, prepared as disclosed in said copending application Serial No. 735,644, was poured into 60 ml. of boiling water with stirring and a sufficient amount of 10% sodium hydroxide solution was added to dissolve the dye and make the solution definitely alkaline. At 60–70° C. commercial sodium dithionite (hydrosulfite) was added in portions until the solution lost its deep red color. The solution was decolorized with charcoal and filtered. On cooling the filtrate, acidifying slightly, and extracting with ether, 1.8 g. (54%) of yellow-colored 5-amino-4-trifluoromethylsalicylic acid was obtained, M.P. 185–186° C., with slow decomposition after recrystallization from water.

*Analysis.*—Calcd. for $C_8H_6O_3NF_3$: C, 43.45; H, 2.74; N, 6.34. Found: C, 43.71; H, 2.99; N, 6.52.

The novel 5-amino-4-trifluoromethylsalicylic acid is useful as an intermediate in the formation of new azo dyes for textiles, particularly as the diazonium components, as shown in the following example.

*Example 6*

5-amino-4-trifluoromethylsalicylic acid is diazotized in the usual way, by acidification with concentrated hydrochloric acid followed by treatment with sodium nitrite, and coupled with 4-trifluoromethylsalicylic acid to form the dye 4 - trifluoromethyl - 5 - (4 - trifluoromethyl-5-salicylazo)salicylic acid. The principal reactions involved are shown in the following equations.

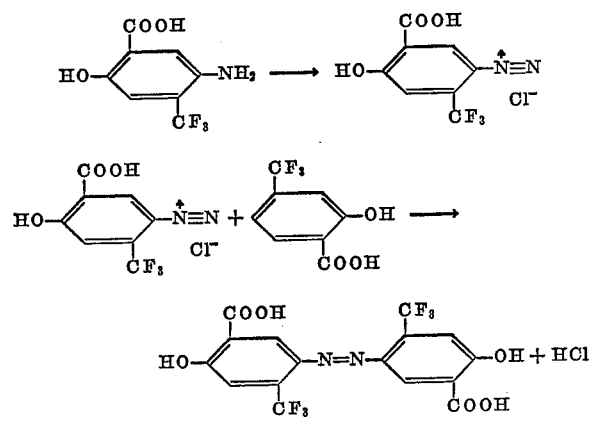

The other novel compounds of this invention are also useful as chemical intermediates in the preparation of azo dyes and may be converted to dyes in the manner shown in Example 6.

Many widely different embodiments of this invention can be made without departing from the spirit and scope thereof and it is to be understood that the invention is not intended to be limited by the above-noted specific embodiments.

I claim:
1. The process for preparing a 4-trifluoromethylsalicylic acid represented by the formula

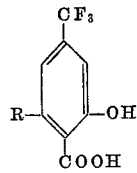

wherein R represents a member selected from the class consisting of H, $NH_2$ and OH which comprises reacting a m-trifluoromethylphenol represented by

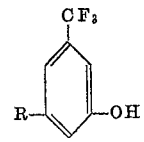

wherein R is the same as above with potassium carbonate and carbon dioxide under pressure at a temperature in the range from about 20° C. to about 250° C. for a period of time at least sufficient for formation of said 4-trifluoromethylsalicylic acid.

2. The process of claim 1 wherein the temperature is slowly raised from about 20° C. to the maximum temperature.

3. The method of preparing 4-trifluoromethylsalicylic acid which comprises reacting 3-trifluoromethylphenol with potassium carbonate and carbon dioxide under pressure at a slowly rising temperature in the range from about 20° C. to about 220° C. for a period of time at least sufficient for formation of said 4-trifluoromethylsalicylic acid.

4. The method of preparing 6-amino-4-trifluoromethylsalicylic acid which comprises reacting 3-amino-5-trifluoromethylphenol with potassium carbonate and carbon dioxide under pressure at a slowly rising temperature in the range from about 20° C. to about 190° C. for a period of time at least sufficient for formation of said 6-amino-4-trifluoromethylsalicylic acid.

5. The method of preparing 4-trifluoromethyl-6-hydroxysalicylic acid which comprises reacting 5-trifluoromethylresorcinol with potassium carbonate and carbon dioxide under pressure at a slowly rising temperature in the range from about 20° C. to about 120° C. for a period of time at least sufficient for formation of said 4-trifluoromethyl-6-hydroxysalicylic acid.

6. 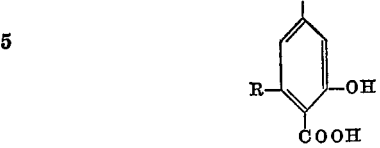

wherein R represents a member selected from the class OH and $NH_2$.

7. 6-amino-4-trifluoromethylsalicylic acid.
8. 4-trifluoromethyl-6-hydroxysalicylic acid.
9. 5-amino-4-trifluoromethylsalicylic acid.

References Cited in the file of this patent

UNITED STATES PATENTS 2,685,600    Morris et al. _____ Aug. 3, 1954

OTHER REFERENCES

Whalley: Jour. Chem. Soc. (London), pp. 3016–3020 (1949).
Caldwell et al.: J.A.C.S., vol. 73, pp. 5125–6 (1951).